United States Patent [19]

Bartholomew

[11] Patent Number: 4,550,953
[45] Date of Patent: Nov. 5, 1985

[54] ELECTRO-PNEUMATIC CONTROL FOR A VEHICLE FLUID PRESSURE BRAKING SYSTEM

[75] Inventor: Roy E. Bartholomew, Elyria, Ohio

[73] Assignee: Allied Corporation, Morristown, N.J.

[21] Appl. No.: 562,321

[22] Filed: Dec. 16, 1983

[51] Int. Cl.⁴ ............................................. B60T 13/22
[52] U.S. Cl. ......................................... 303/15; 303/71
[58] Field of Search ............... 303/15, 16, 17, 3, 7, 303/9, 13, 71, 6 M, 18, 20, 28–30; 188/170, 151 A, 106

[56] References Cited

U.S. PATENT DOCUMENTS

| | | | |
|---|---|---|---|
| 3,482,885 | 12/1969 | Campanini | 303/7 |
| 3,482,886 | 12/1969 | Dobrikin | 303/7 |
| 3,497,268 | 2/1970 | Dobrikin | 303/7 |
| 3,507,543 | 4/1970 | Cannella | 303/7 |
| 3,819,238 | 6/1974 | Cermak | 303/15 X |
| 3,985,210 | 10/1976 | Hodge et al. | 188/170 |
| 4,049,324 | 9/1977 | Cermak | 303/7 |
| 4,339,154 | 7/1982 | Duttarer | 303/3 |

Primary Examiner—Douglas C. Butler
Attorney, Agent, or Firm—Ken C. Decker; William N. Antonis

[57] ABSTRACT

An electro-pneumatic control system (10) for a vehicle fluid pressure braking system controls communication to the trailer supply line (30) and to the vehicle spring applied, fluid pressure released parking brakes (78). Relays (66,92) are controlled by manually actuated switches (42,58) to actuate solenoid valves (74,84) which control communication to the supply line (30) and to the parking brakes (78). Actuation of the solenoid valves (74,84) is maintained by the relays (66,92) in response to pressure actuated switches (76,88) which are responsive to the pressure levels in the supply line (30) and in the parking brake (78).

18 Claims, 1 Drawing Figure

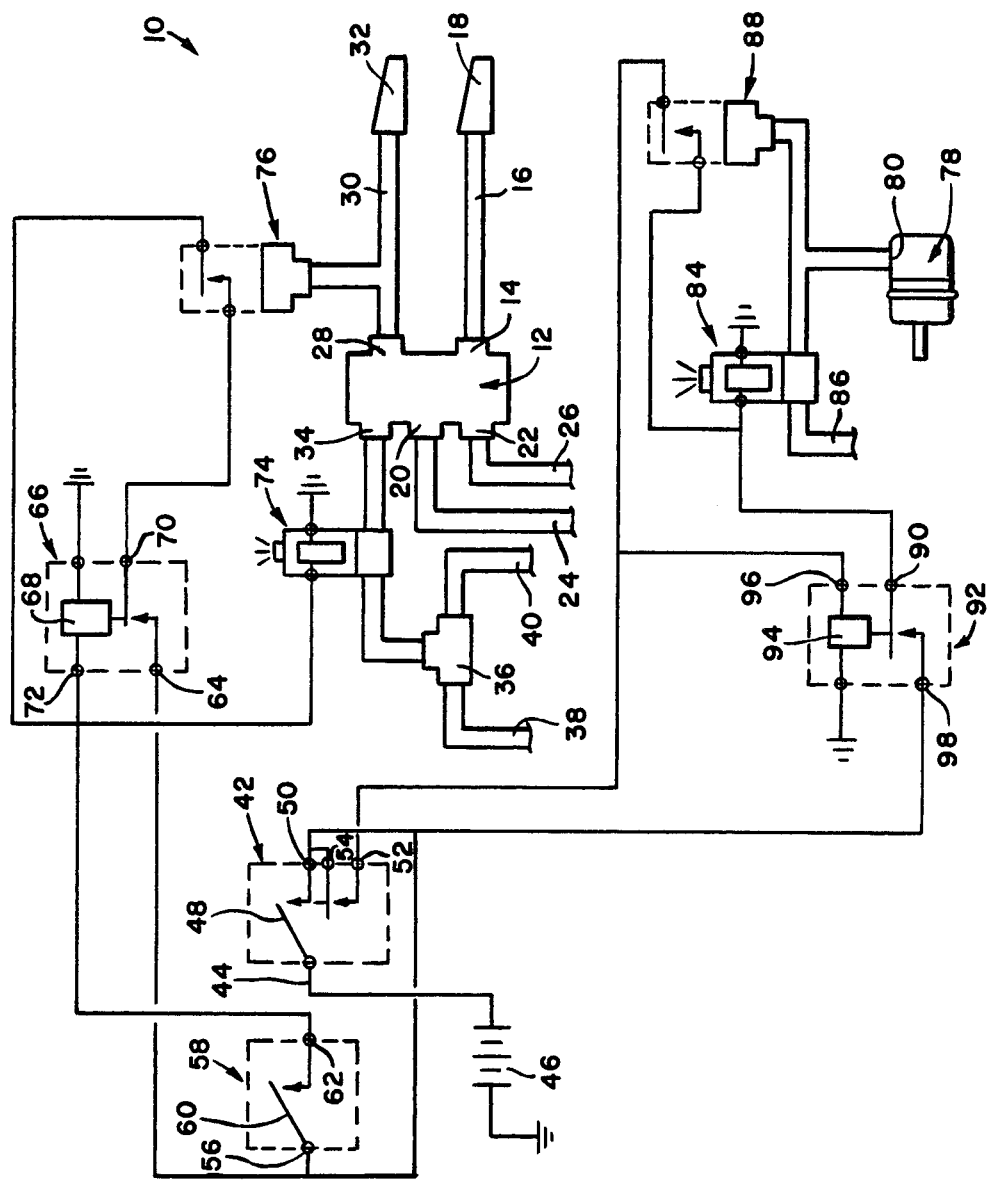

ELECTRO-PNEUMATIC CONTROL FOR A VEHICLE FLUID PRESSURE BRAKING SYSTEM

This invention relates to an electro-pneumatic control for a vehicle fluid pressure braking system.

Existing vehicles equipped with air brakes require relatively complicated pneumatic connections under the dash of the vehicle in order to connect the air brake system with control valves that are accessible to the vehicle operator. Accordingly, it has been proposed that the pneumatic valves currently used on vehicle air brake systems be replaced by an electro-pneumatic system in which electrical switches on the dashboard are used to control communication in the air brake system to effect release of, for example, the vehicle parking brakes. Such a system as shown in, for example, U.S. Pat. No. 4,339,154 (Duttarer et al). However the system disclosed in this reference does not include pressure responsive sensors to automatically permit the system to communicate full braking pressure to the vehicle parking brake system, and also does not require that the system be completely re-set in case of a loss of pressure that results in the application of the vehicle spring or parking brake.

Accordingly, the system of the present invention has the advantage of eliminating all pressure connections within the cab of the vehicle on which the system is mounted, as the pneumatic connections formerly necessary are replaced with electro mechanical switches. The system according to the present invention also has the advantage of permitting pressure in the vehicle parking brake system to build up to full system pressure after the switches are operated to communicate a predetermined minimum pressure level to the vehicle parking brake system. The system also has the advantage of requiring that the system be completely re-set in the event that the parking or spring brake is automatically applied due to a loss of system pressure. Accordingly, the present system requires that system pressure be returned to normal after a system pressure loss so that the parking brakes may be released in the normal manner.

Accordingly, the present invention comprises an electro-pneumatic control for a fluid pressure braking system having a source of fluid pressure and a fluid pressure device, the electro pneumatic control comprising electrically actuated valve means controlling communication to the fluid responsive device from said fluid pressure source, switch means for controlling the electrically actuated valve means, and a pressure responsive switching device responsive to the fluid pressure level at the fluid pressure device for maintaining actuation of said electrically actuated valve means as long as the pressure level at said fluid pressure device is above a predetermined level after the pressure level at said fluid pressure device initially attains said predetermined level.

Other features of the invention will appear in the following description with reference to the accompanying drawings, the sole Figure of which is a schematic illustration of an electro-pneumatic control for a fluid pressure braking system made pursuant to the teachings of my present invention.

Referring now to the drawing, an electro-pneumatic control system for a vehicle fluid pressure braking system is generally indicated by the numeral 10 for the tractor portion of a tractor-trailer combination vehicle. The system 10 includes a conventional tractor protection valve generally indicated by the numeral 12. The tractor protection valve 12 includes an outlet port 14 which is communicated with a trailer control line 16. The trailer control line 16 terminates in a gladhand connector 18 of conventional design, which is adapted to be connected to a corresponding line on the trailer so that a service brake actuation signal may be communicated through the control line 16 to actuate the service brakes on the trailer. The tractor protection valve 12 further includes a pair of inlet ports 20,22 which are connected, via fluid lines 24,26 respectively, to the corresponding outlet ports (not shown) of a conventional, treadle-operated dual brake valve which, is mounted in the vehicle cab for operation by the vehicle operator when a service brake application is to be effected. The tractor protection valve 12 includes mechanism (not shown) for selecting the higher of the fluid pressure levels at the ports 20,22 for communication through the outlet port 14 to the trailer control line 16. Tractor protection valve 12 further includes another outlet port 28 which is communicated with a trailer supply line 30. Trailer supply line 30 terminates in another gladhand connector 32 which is adopted for connection to a corresponding connector on the trailer so that fluid pressure communicated through the supply line 30 is able to charge reservoirs carried on the trailer. Tractor protection valve 12 further includes an inlet port 34 which is connected to a double check valve 36 of conventional design, which communicates the inlet port 34 of the tractor protection valve 12 with the higher of the fluid pressure levels communicated through lines 38,40. The pressure lines 38,40 are each connected to separated, isolated fluid pressure sources, such as fluid reservoirs, which are charged by, for example, the vehicle automotive air compressor. The tractor protection valve communicates the inlet port 34 to the outlet port 28 thereof to effect charging of the aforementioned reservoir carried by the trailer when the trailer supply line 30 is connected to the corresponding supply line on the trailer.

Electro-pneumatic control system 10 further includes a double pole, single throw, push-through switch generally indicated by the numeral 42. The terminal 44 of the switch 42 is connected to a source of electrical energy, such as the vehicle storage battery 46. A switch lever or knob 48 may be thrown to connect the terminal 44 with terminal 50. The lever or knob 48 can also be "pushed through" to make momentary contact between the terminal 52 and terminal 54, which is common with the terminal 50. The terminal 50 is connected to a terminal 56 of a single pole, single throw, push-to-close momentary contact electrical switch 58. As long as the switch operator 60 is depressed by the vehicle operator, the switch 58 completes an electrical circuit between the terminal 56 and the terminal 62 thereof.

Terminal 50 of switch 42 and terminal 56 of switch 58 are both connected to a terminal 64 of an electrical relay generally indicated by the numeral 66. The relay 66, upon energization of the coil 68 thereof, completes an electrical circuit between the terminal 64 and the terminal 70 thereof. The coil 68 of the relay 66 is connected through a terminal 72 of the relay 66 to the terminal 62 of the switch 58. The terminal 64 of the relay 66 is connected to the terminal 50 of the switch 42 and the terminal 56 of the switch 58. Terminal 62 of switch 58 is also connected to a solenoid-controlled valve generally indicated by the numeral 74 which controls communication from the double check valve 36 to the inlet port 34 of the tractor protection valve 12. The solenoid valve 74 is normally closed to prevent communication to the inlet port 34 of the tractor protection valve and to vent the inlet port 34 to atmosphere. However, when the solenoid valve 74 is actuated, the vent is closed, and the inlet port 34 is communicated to the outlet of the double check valve 36. A pressure-responsive switch generally indicated by the numeral 76 is responsive to the pressure level in the supply line 30 to close an electrical circuit connecting the terminal 70 of the relay 66 with the coil 68 thereof when the pressure level in the supply line 30 exceeds a predetermined level.

Electro-pneumatic control system 10 further includes a spring-applied, fluid pressure-released parking brake generally indicated by the numeral 78, which is of conventional design. The parking brake 78 is released by hold-off pressure communicated to the inlet port 80 thereof through supply line 86. When the pressure in supply line 86 is vented, aforementioned actuator, not shown, applies the vehicle brake. A solenoid valve generally indicated by the numeral 84 is installed in the supply line 86, and normally vents the port 80 to atmosphere, but is responsive to an electrical signal to close the vent and communicate the port 80 with a fluid pressure source (not shown) which is communicated with the upstream portion of the supply line 86. A pressure-responsive switch 88 similar to the pressure-responsive switch 76 is also installed in communication with the port 80. The pressure-responsive switch 88 is responsive to a predetermined pressure level in the supply line 86 downstream of the solenoid valve 84 to close an electrical circuit between the terminal 90 of an electrical relay generally indicated by the numeral 92 and the coil 94 thereof through a terminal 96. The other terminal 98 of the relay 92 is connected to the terminal 50 of the switch 42. Terminal 96 of the switch 92 is also connected with the terminal 52 of the switch 42.

In operation, when the vehicle is parked, the port 80 of the parking brake 78 is vented through the solenoid valve 84 so that the parking brake 78 is applied. Similarly, the supply line 30 is vented through the solenoid valve 74, and, since the parking brakes on the trailer are controlled by the pressure in supply line 30, the parking brakes on the trailer will also be applied. When the vehicle operator starts the engine and desires to move the vehicle, the vehicle operator closes the switch operator 48 to complete the electrical circuit between the terminals 44,50 of the switch 42, thereby connecting the terminals 64 and 98 or the relays 66 and 92 respectively with the source of electrical energy 46. Assuming that the engine has operated for a sufficient length of time that the vehicle air compressor has charged the reservoirs on the tractor sufficiently, the operator then closes the switch 58 by holding down the switch operator 60 to connect the terminals 56 with the terminals 62 thereof. Accordingly, the coil 68 of the relay 66 is actuated, and the solenoid valve 74 is actuated to communicate double check valve 36 with supply line 30. When the pressure in the supply line 30 attains a predetermined level, the switch 76 closes and, since actuation of the solenoid 68 has already closed the circuit between terminal 64 and 70 of the electrical relay 66, closure of the pressure-actuated switch 76 completes an electrical circuit between the electrical energy source 46 and the solenoid valve 74 so that the vehicle operator may then release the operator 60 of the switch 58 while the pressure-responsive switch 76 maintains actuation of the solenoid valve 74. Accordingly, pressure in the supply line 30 then automatically increases to full system pressure. Simultaneously, the vehicle operator "pushes through" the operator 48 of the switch 42 to connect the terminal 52 of the switch 42 with the source of electrical energy 46. Accordingly, coil 94 of the relay 92 is actuated to complete the electrical circuit between the terminals 98 and 90 thereof. Since the terminal 98 has already been connected to the source of electrical energy 46 due to closure of the circuit between the terminals 44 and 50 of the switch 42, actuation of the coil 94 of relay 92 actuates the solenoid valve 84 to permit communication of the inlet port 80 of the parking brake 78 with the portion 86 of the supply line 82 which is communicated to the fluid pressure source. Accordingly, the pressure level in the parking brake 78 begins to build to release the brake. When the pressure level at the port 80 attains a predetermined level, the pressure-responsive switch 88 closes, thereby completing an electrical circuit between the coil 94 and the terminal 90 of the relay 92. Since the terminal 90 has already been connected to the source of electrical energy 46, the pressure-responsive switch 88 maintains actuation of the solenoid valve 84, permitting release of the switch operator 48, even though the switch operator 48 remains in the position connecting the terminal 44 with the terminal 50. Accordingly, the pressure at the parking brake 78 is permitted to build to full system pressure to maintain release of the parking brake 78.

When the vehicle is to be parked, and it is necessary to vent the supply line 30 to apply the trailer parking brakes and to vent the supply line 82 to apply the parking brake 78, switch operator 48 is moved to the position illustrated in the drawing, thereby breaking the connection between the terminals 44 and 50 of the switch 42. This breaks the electrical connection to the source of electrical energy 46 and the terminal 64 on relay 66 and the terminal 98 on relay 92. Power is also removed to the solenoid valves 74 and 84, thereby venting the supply line 30 and the supply line 86. If the fluid pressure braking system on either the tractor or trailer should malfunction, causing a loss of pressure in either the supply line 30 or the supply line 86, the corresponding pressure-responsive switch 76 or 88 opens. For example, if the switch 76 opens, the connection between the solenoid valve 74 and the electrical energy source 46 is broken, thereby causing valve 74 to terminate communication between the double check valve 36 and the inlet port 34 of tractor protection valve 12 and to vent the inlet port 34 of tractor protection valve 12 to atmosphere. In order to again charge the supply line 30, the switch 58 must be actuated by the vehicle operator to close the valve 74 until pressure builds in the system sufficient to reopen the switch 76. Similarly, in the case of a failure in the pressure to supply line 86, switch 88 opens to break the connection between the solenoid valve 84 and the electrical energy source 46 and also to remove power to the coil 94 so that the relay 92 opens. Accordingly, the parking brake 78 will not immediately be recharged in case system pressure returns to normal, but the parking brake 78 will continue to be vented through the solenoid valve 84 until the vehicle operator again closes the push-through contact 52 to build pressure in the system as described hereinabove.

I claim:

1. Electro-pneumatic control for a fluid pressure braking system having a source of fluid pressure and a fluid pressure device, said electro-pneumatic control comprising electrically actuated valve means controlling communication to said fluid pressure device from said fluid pressure source, switch means for controlling said electrically actuated valve means, and a pressure-responsive switching means responsive to the fluid pressure level at said fluid pressure device for maintaining actuation of said electrically actuated valve means as long as the pressure level at said fluid pressure device is above a predetermined level after the pressure level at said fluid pressure device initially attains said predetermined level.

2. Electro-pneumatic control as claimed in claim 1, wherein said switch means includes manually actuated switch means for actuating the electrically actuated valve means, said pressure-responsive switching means maintaining actuation of the electrically actuated valve means to permit release of said manually actuated switch means while maintaining communication to the fluid pressure device when the pressure level sensed by the pressure-responsive switching means attains the predetermined level.

3. Electro-pneumatic control as claimed in claim 2, wherein said switch means includes an electrically actuated switching means responsive to both said pressure-responsive switching device and to said manually actuated switch means for actuating said electrically actuated valve means when said manually actuated switch means is operated and when the pressure remains above said predetermined level.

4. Electro-pneumatic control as claimed in claim 3, wherein said switch means includes a manually actuated switch device for connecting said manually actuated switch means and said electrically actuated switching device with a source of electrical energy, said manually actuated switch means being actuated to operate said electrically actuated switching device to connect said electrically actuated valve means and said electrically actuated switching device with said source of electrical energy.

5. Electro-pneumatic control as claimed in claim 1, wherein said switch means includes electrically actuated switch means for connecting said electrically-actuated valve means with a source of electrical energy, manually actuated switch means for controlling said electrically actuated switch means, and a manually actuated switching device for connecting said manually actuated switch means and said electrically actuated switch means with a source of electrical energy.

6. Electro-pneumatic control as claimed in claim 5, wherein said electrically actuated switch means includes an electrically actuated mechanism for opening and closing said switch means, said electrically actuated mechanism being connected to both said manually actuated switch means and to said pressure-responsive switching means whereby said electrically actuated switch means is controlled by both said pressure-responsive switching device and by said manually actuated switch means.

7. Electro-pneumatic control as claimed in claim 6, wherein said fluid pressure device is a mechanically applied, fluid pressure released parking brake, said electrically actuated valve means being normally open to vent said parking brake and being actuable to communicate fluid pressure to said parking brake, said pressure-responsive switching means being responsive to said predetermined pressure level after actuation of said electrically actuated valve means.

8. Electro-pneumatic control as claimed in claim 6, wherein said fluid pressure device is a trailer supply line, said electrically actuated valve means being normally open to vent said trailer supply line and being actuable to communicate fluid pressure to said trailer supply line, said pressure-responsive switching means being responsive to said predetermined pressure level after actuation of said electrically actuated valve means.

9. Electro-pneumatic control for a fluid pressure braking system having a source of fluid pressure, a trailer supply line adapted for communication with the fluid pressure source, a mechanically applied, fluid pressure released parking brake adapted for communication with said fluid pressure source, said electro-pneumatic control controlling pressure communication between said fluid pressure source, said trailer supply line, and said parking brake and including a pair of electrically actuated valve means for controlling communication to said trailer supply line and to said parking brake, switch means including manually actuated switch means for actuating said electrically actuated valve means, and a pair of pressure-responsive switching means for maintaining actuation of a corresponding one of said electrically actuated valve means to permit release of said manually actuated switching means.

10. Electro-pneumatic control as claimed in claim 9, wherein said switch means includes electrically actuated switching devices responsive to a corresponding one of said pressure-responsive switch devices and to a corresponding one of said manually actuated switch means for maintaining actuation of a corresponding one of said electrically actuated valve means.

11. Electro-pneumatic control as claimed in claim 10, wherein said switch means includes a manually actuated switching device for connecting said manually actuated switch means and said electrically actuated switching devices with a source of electrical energy.

12. Electro-pneumatic control as claimed in claim 9, wherein said switch means includes a pair of electrically actuated switch means, each of said electrically actuated switch means controlling one of said electrically actuated valve means, said switch means further including a manually actuated switching device for connecting said manually actuated switch means and each of said electrically actuated switch means with a source of electrical energy.

13. Electro-pneumatic control as claimed in claim 12, wherein each of said electrically actuated switch means includes an electrically actuated mechanism for opening and closing said switch means, said electrically actuated mechanism being connected both to said manually actuated switch means and to a corresponding one of said pressure-responsive switching means.

14. Electro-pneumatic control for a fluid pressure braking system having a source of fluid pressure, a mechanically applied, fluid pressure released parking brake adapted for communication with said fluid pressure source, said electro-pneumatic control controlling pressure communication between said fluid pressure source and said parking brake and including electrically actuated valve means for controlling communication to said parking brake, switch means including manually actuated switch means for actuating said electrically actuated valve means, and a pressure-responsive switching means for maintaining actuation of said electrically actuated valve means to permit release of said manually actuated switch means.

15. Electro-pneumatic control as claimed in claim 14, wherein said switch means includes an electrically actuated switching device responsive to both said pressure-responsive switching means and to said manually actuated switch means for actuating said electrically actuated valve means when said manually actuated switch means is operated and when the pressure remains above a predetermined level.

16. Electro-pneumatic control as claimed in claim 15, wherein said switch means includes a manually actuated switch device for connecting said manually actuated switch means and said electrically actuated switching device with a source of electrical energy, said manually actuated switch means being actuable to operate said electrically actuated switching device to connect said electrically actuated valve means and said electrically actuated switching device with said source of electrical energy.

17. Electro-pneumatic control as claimed in claim 14, wherein said switch means includes electrically actuated switch means for connecting said electrically-actuated valve means with a source of electrical energy, manually actuated switch means for controlling said electrically actuated switch means, and a manually actuated switching device for connecting said manually actuated switch means and said electrically actuated switch means with a source of electrical energy.

18. Electro-pneumatic control as claimed in claim 17, wherein said electrically actuated switch means includes an electrically actuated mechanism for opening and closing said switch means, said electrically actuated mechanism being connected to both said manually actuated switch means and to said pressure-responsive switching means whereby said electrically actuated switch means is controlled by both said pressure-responsive switching means and by said manually actuated switch means.

* * * * *